United States Patent [19]
Osaheni et al.

[11] Patent Number: 6,030,660
[45] Date of Patent: *Feb. 29, 2000

[54] METHOD OF STEAM STRIPPING AN INORGANIC POWDER

[75] Inventors: John Aibangbee Osaheni, Clifton Park; John Brian McDermott, Rexford; John Peter Banevicius, Clifton Park, all of N.Y.

[73] Assignee: General Electric Company, Schenectady, N.Y.

[*] Notice: This patent is subject to a terminal disclaimer.

[21] Appl. No.: 08/994,571

[22] Filed: Dec. 19, 1997

[51] Int. Cl.[7] ........................................................ B05D 7/00
[52] U.S. Cl. ........................... 427/215; 427/212; 427/214
[58] Field of Search .................................... 427/212, 214, 427/215, 335, 336, 337, 340, 344

[56] References Cited

U.S. PATENT DOCUMENTS

| | | | |
|---|---|---|---|
| 3,562,153 | 2/1971 | Tully et al. | 210/36 |
| 4,054,689 | 10/1977 | Calvin | 427/215 |
| 4,503,092 | 3/1985 | Klebe et al. | 427/213 |
| 4,554,147 | 11/1985 | Stoll et al. | 423/335 |
| 5,037,557 | 8/1991 | Warrenchak et al. | 210/691 |
| 5,652,017 | 7/1997 | Osaheni et al. | 427/212 |

Primary Examiner—Shrive Beck
Assistant Examiner—Paul D. Strain
Attorney, Agent, or Firm—Bernadette M. Bennett; Donald S. Ingraham

[57] ABSTRACT

The invention provides a method of steam stripping an inorganic powder by contacting the inorganic powder with a silylating agent to form a silylated mixture which is pneumatically transported and contacted with steam to form a vaporous stream. This vaporous stream is then transported to a separation stage and the volatile materials are separated from the inorganic powder.

13 Claims, No Drawings

METHOD OF STEAM STRIPPING AN INORGANIC POWDER

FIELD OF INVENTION

The present invention relates to a method of steam stripping an inorganic powder

BACKGROUND OF THE INVENTION

Inorganic powders, such as fumed silica, are used as thickeners, thixotropics, and reinforcing agents in materials such as inks, resins, rubber, paints and cosmetics. More particularly, they are used to modify the properties, such as the physical, mechanical and thermal properties, of a variety of plastic and elastomeric products such as silicone rubbers.

Inorganic powders are also used as sorbents as disclosed in U.S. Pat. No. 5,037,557. For example, inorganic powders can be used to absorb hydrocarbons, such as oil, from water. Silica is one of the inorganic powders which is used as a sorbent for organic compounds. This requires the silica, which has untreated hydrophilic hydroxy groups on its surface, to be treated with a silylating agent to render it hydrophilic.

In recent times the chemical industry has been adhering to stringent emission requirements for new and existing plants. However, it is increasingly becoming more challenging, especially when by-products of a chemical processes have low melting points and high vapor pressures at ambient conditions. Illustrative examples of such by-products are organosilicon materials such as hexamethyldisilazane (HMDZ), hexamethyldisiloxane (MM), and trimethylsilanol (TMSOH).

The current technology uses a non-condensable gas, such as nitrogen, to convey and strip undesired volatile by-products from the chemical processes. New emission standards, for example, which limit the emission of mole fraction of MM to 0.004 mole/h, based on a plant running 123 Kg/h of nitrogen, is very stringent, considering the physical properties of MM. Conventional condenser technology does not help meet these stringent emission requirements. There is thus a need for an efficient process that will help isolate residual volatiles from silica treatment processes. Grinberg et al., in the Russ. J. of Chem. 60 (5) 779 (1986) report experimental values indicated a MM vapor pressure of 17.5 mm of Hg at 7° C. using the conventional condenser technology. The vapor pressure value indicates an emission of MM which is greater than the 0.004 mole/h, as required by the new emission standards.

It has been surprisingly found that the process of the present invention provides an efficient and effective method for isolating residual volatiles from a silica treatment process. The process of the present invention uses condensable gas, namely, steam, to convey (transport) and strip residual volatiles from a silica treatment process. The present invention is not restricted to a silica treatment process, and can be used to remove volatile by-products from other inorganic processes.

SUMMARY OF THE INVENTION

Keeping the various needs in mind, the present invention provides a method of steam stripping an inorganic powder, comprising, (a) contacting the inorganic powder with a silylating agent to form a silylated mixture; (b) pneumatically conveying and contacting the silylated mixture with steam to form a vaporous stream; and (c) transporting the vaporous stream to a separation stage and removing volatiles.

DETAILED DESCRIPTION OF THE INVENTION

Preferred embodiments provide a method wherein the inorganic powder is fumed silica and the silylating agent is in the range of about 4% to about 40%, based on the weight of fumed silica. A further preferred embodiment provides a method wherein the silylating agent is represented by the formula $[(R^1)_3Si]_aZ$, wherein $R^1$ at each occurrence is independently an aromatic hydrocarbon, halogenated aromatic hydrocarbon, $C_{6-10}$ aralkyl, $C_{1-8}$ alkyl or $C_{4-8}$cyclo alkyl, $C_{2-8}$ alkenyl, $C_{1-8}$ haloalkyl or cycloalkyl; Z is hydroxy, $-N(R^2)_2$, $-SR^2$, $-O-$, $-S-$ or $OCOR^2$; $R^2$ is hydrogen or $R^1$, and "a" is 1 or 2, preferably $R^2$ independently at each occurrence is hydrogen, $C_{1-8}$ alkyl or $C_{4-8}$ cyclo alkyl. Preferred silylating agent is triorganosilyl mercaptans, triorganosilyl acylates, triorganosilylamines, triorganosilylaminoxy compounds, disiloxanes, or disilazanes.

Another embodiment provides a method wherein the fumed silica is contacted with the silylating agent in the presence of a proton source. The proton source is generally water or a protonic acid. The preferred protonic acid has a boiling point at atmospheric pressure up to about 120° C., with formic acid being the most preferred protonic acid. A preferred method is one wherein the proton source is up to about 1.5% by weight of the fumed silica.

Provided in yet another embodiment of the invention is a method wherein the silica is pneumatically conveyed by using steam. Particularly preferred is a method wherein the silica is pneumatically conveyed using steam at a temperature of from about 105° C. to about 250° C. so as to exceed the saltation velocity of fumed silica.

A preferred embodiment provides a method wherein the volatile contents are separated from the silylated fumed silica under conditions facilitating the volatilization of the non-fumed silica agents. A further preferred embodiment provides a method wherein the volatile nonfumed silica material is removed by venting the volatiles to an exhaust system such that the exhausted volatiles are condensed at a temperature lower than about 100° C.

Silylating agents which can be employed in the instant invention include polyorganosiloxanes, especially hexaorganodisiloxanes, in which the organic groups may be alkyl, fluoroalkyl, alkenyl or aryl and especially methyl; triorganosilyl compounds including mercaptans, acylates, amines and aminoxy compounds; and silazanes such as hexamethyldisilazane and 1,3-diphenylhexamethyidisilazane. Certain of the less reactive reagents, such as disiloxanes not containing other functional groups, can be efficiently utilized only with the use of linear phosphonitrilic halides as the third reagent, as explained more fully hereinafter. The preferred silylating agents in many instances are hexamethyldisilazane, trimethylsilanol and bis(trimethylsilyl) carbonate. Silylating agents having a boiling point lower than the temperature at which the silica is being processed (in other words, gas phase silylation) is especially preferred.

Illustrative aromatic hydrocarbon and halogenated aromatic hydrocarbon radicals are phenyl, tolyl, xylyl, naphthyl, chlorophenyl and chloronaphthyl. Illustrative aralkyl radicals are benzyl and phenylethyl. Illustrative alkyl and haloalkyl radicals are methyl, ethyl, propyl, butyl, pentyl, hexyl, heptyl, octyl, chloropropyl and trifluoropropyl. Illustrative alkenyl radicals are vinyl, allyl and 1-propenyl. Illustrative cycloalkyl radicals are cyclobutyl, cyclopentyl and cyclohexyl.

The method of the invention optionally utilizes a third reagent which may be a relatively volatile protonic acid or a linear phosphonitrilic halide. Suitable protonic acids include hydrochloric acid, carbonic acid, formic acid and acetic acid. Preferably, the acid has a boiling point at atmospheric pressure of up to about 120° C. Formic acid is preferred by reason of its particular effectiveness and relatively low cost. It may be employed in an aqueous solution; for example, as an 88% (by weight) solution. Saltation velocity is defined as the speed at which the treated (silylated) inorganic powder like fumed silica is transported in a vaporous form without letting it settle to the bottom or the sides of a reaction vessel.

The preferred linear phosphonitrilic halides are the chlorides, hereinafter sometimes designated "LPNC". They have the formula $Cl_3P(NPCl_2)_nNPCl_3.PCl_6$, wherein n is 0–4, and preferably 0–2. The LPNC's can be made by procedures described in U.S. Pat. No. 3,839,388 incorporated herein by reference.

It is particularly surprising that the LPNC's function as catalysts in the method of this invention. Fumed silica contains minor proportions of water, and it is known that water causes decomposition of LPNC's. Therefore, the fact that said LPNC's can be employed for this purpose is unexpected.

The amount of silylating agent used in the method determines in part the degree of removal of silanol groups from the vaporized silylated silica stream. A silanol group is considered removed when an active hydrogen therein is displaced by a silyl group of the formula $-Si(R^1)_3$. The more silylating agent utilized, the more surface silanol removal occurs. Preferably, an amount of silylating agent is utilized that is at least a stoichiometric quantity based on the proportion of surface silanol groups. This is in general in the range of about 4 to about 200% by weight based on silica.

It is often preferred to mechanically fluidize the mixture of silica, silylating agent and third reagent. The fluidizing can be accomplished by any equipment known in the art which will provide thorough blending and constant mechanical agitation sufficient to suspend the silica particles in the volatilized silylating agent. The fluidizing can be conducted as a batch process or as a continuous process. Suitable fluidizing equipment comprises mixers which incorporate rotating impellers with various blade angles, kneading mixers, helical-blade mixers and screw mixers.

The reaction temperature is not critical, an illustrative range being from about 25 to about 400° C. The temperature is most often above the boiling point of the silylating agent and below the inactivation temperature of an LPNC, if employed. Preferably, the temperature is in the range of about 100–250° C. for protonic acid-containing systems and about 100–150° C. for LPNC-containing systems.

Reaction time is dependent on the reaction conditions, including proportions and temperature. It is also dependent on the degree to which removal of surface silanol groups is desired. The longer the reaction is allowed to proceed, the greater the proportion of such groups that will be removed. With a higher fluidizing temperature, a shorter reaction time is required to achieve a desired level of silanol removal. The necessary level of silanol removal and the time and temperature parameters required to meet that level will be determinable by those skilled in the art.

EXAMPLES

The method of this invention is illustrated by the following general procedure and examples:

Fumed silica is treated in a reaction vessel with a silylating agent such as HMDZ. The resulting silylated silica mixture can be penumatically conveyed using low pressure stream of steam generated from up to about 15 gallons/hour of water fed to a stream generation assembly to a baghouse containing up to about three cages of filler bags for gas (volatiles)-solids separation. The stripped filler falls by gravity from the baghouse to a product collection container via a rotary airlock system. The steam carrying volatiles is then condensed using water condensers and recovered. The volatiles are thus trapped and their escape to the atmosphere is avoided.

Example 1

The batch reaction set-up consists of a 4-liter autoclave reactor equipped with a pressure gauge and a thermocouple, steam or air injection valves, liquid reagent injection port, and a ventline valve having a 140 micron NUPRO® in-line filter. The ventline was connected to a condenser trap at 5° C. To this reactor was charged 151 g of raw fumed silica, which was treated with 39.5 ml of HMDZ at 256° C. for 20 minutes. After the treatment reaction 32.5 g of low pressure steam at 125° C. was injected into the reactor. The fumed silica/steam was stirred at 300 rpm for 10 minutes and then vented. The stripping step was repeated. The level of stripping was measured by acid-base titration and was found to meet the specifications of less than 50 ppm residual nitrogen. Thermogravimetric analysis (TGA) showed less than 0.1 weight percent loss when heated from room temperature to 400° C., supporting the good stripping of residual volatiles. Karl Fischer titration for the amount of residual moisture showed 650 parts per million water left on the filter, which meet the specifications of a well stripped treated fumed silica.

Material balance around the reactor and the trap at 5° C. showed that virtually all the stripped volatiles condensed along with the steam.

Example 2

Pilot scale batch steam stripping with subsequent conveying to storage.

2200 lb of octamethyltetracyclosiloxane treated silica was charged to a 6000 gallon batch kettle and treated with 440 lbs of HMDZ for 4 hours. After the reaction, nitrogen gas was used to strip the excess volatiles to a light ends receiver operating at 25° C. The treated silica was subsequently moved out of the kettle with a nitrogen stream introduced at the top of the vessel and pneumatically conveyed to a silo. Material balance around the kettle and light ends receiver shows that about 10% of the volatiles could not be recovered. However, when this experiment was repeated with steam as the stripping and conveying agent, virtually all volatiles were condensed and accounted for.

Example 3

Continuous steam stripping and conveying A continuous filler treatment process using HMDZ chemistry was set-up wherein fumed silica was treated in the reactor at 5–30 pounds/hour with 1–2.5 pounds/hour of HMDZ. HMDZ and the filler along with excess vapors of ammonia, MM, TMSOH, and HMDZ exiting the reactor was pneumatically conveyed with low pressure steam generated from 2–10 gallons/hour of water fed to the steam generation assembly, to a baghouse containing 3 cages of NOMEX® filter bags (20 ft² total surface area) for gas (volatiles)-solids separation. The stripped filler fell by gravity from the baghouse to a product drum through rotary airlock system. The steam, along with the vapors, was condensed using water condensers and recovered. With a blower pulling approximately −30 inches of water pressure, the process ran satisfactorily, losing less than 1% of the volatiles. On the other hand, when nitrogen was used in place of steam, we lost better than 30% of the volatiles.

What is claimed is:

1. A method of steam stripping an inorganic powder comprising:

(a) contacting the inorganic powder with a silylating agent to form a silylated mixture;

(b) pneumatically conveying and contacting the silylated mixture with steam to form a vaporous stream; and (c) transporting the vaporous stream to a separation stage and removing volatiles.

2. A method according to claim 1 wherein the inorganic powder is fumed silica, and the silylating agent is in the range of about 4% to about 40%, based on the weight of fumed silica.

3. A method according to claim 2 wherein the silylating agent has the formula $[(R^1)_3Si]_aZ$, wherein:

$R^1$ at each occurrence is independently an aromatic hydrocarbon, halogenated aromatic hydrocarbon, $C_{6-10}$ aralkyl, $C_{1-8}$ alkyl, $C_{2-8}$ alkenyl, $C_{1-8}$ haloalkyl or cycloalkyl;

Z is hydroxy, —N($R^2$)$_2$, —S$R^2$, —O—, —S— or OCO$R^2$;

$R^2$ independently at each occurrence is hydrogen or $R^1$, and a is 1 or 2.

4. A method according to claim 3 wherein the fumed silica is contacted with the silylating agent in the presence of a proton source.

5. A method according to claim 4 wherein the proton source is water or a protonic acid.

6. A method according to claim 5 wherein the proportion of the proton source is up to about 1.5% based on the weight of the fumed silica.

7. A method of claim 6 wherein $R^2$ is H, $C_{1-8}$ alkyl, or $C_{4-8}$ cycloalkyl.

8. A method according to claim 7 wherein the silylating agent is a triorganosilyl mercaptan, triorganosilyl acylate, triorganosilylamine, trioranousilylaminoxy compound, disiloxane, or disilazane.

9. A method according to claim 8 wherein the protonic acid has a boiling point at atmospheric pressure of up to about 120° C.

10. A method according to claim 9 wherein the protonic acid is formic acid.

11. A method according to claim 5 wherein the silylated silica mixture is pneumatically transported using steam at a temperature of from about 105° C. to about 250° C. so as to exceed the saltation velocity of fumed silica.

12. A method according to claim 11 wherein the volatile contents are separated from the silylated fumed silica under conditions facilitating the volatilization of the non-fumed silica agents.

13. A method according to claim 12 wherein the volatile non-fumed silica material is removed by venting the volatiles to an exhaust system such that the exhausted volatiles are condensed at a temperature lower than about 100° C.

* * * * *